United States Patent
Pathak et al.

(10) Patent No.: US 11,966,784 B2
(45) Date of Patent: Apr. 23, 2024

(54) CLOUD-NATIVE APPLICATION RESERVATION MANAGEMENT METHOD AND APPARATUS

(71) Applicant: RAKUTEN MOBILE, INC., Tokyo (JP)

(72) Inventors: Mihir Pathak, Tokyo (JP); Amey Sandesh Wadekar, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 184 days.

(21) Appl. No.: 17/646,137

(22) Filed: Dec. 27, 2021

(65) Prior Publication Data

US 2023/0205590 A1 Jun. 29, 2023

(51) Int. Cl.
G06F 9/50 (2006.01)
H04L 67/1008 (2022.01)

(52) U.S. Cl.
CPC ........ *G06F 9/5038* (2013.01); *H04L 67/1008* (2013.01)

(58) Field of Classification Search
None
See application file for complete search history.

(56) References Cited

U.S. PATENT DOCUMENTS

| | | | | |
|---|---|---|---|---|
| 7,328,166 B1 * | 2/2008 | Geoghegan | ............ | G06Q 10/02 705/5 |
| 8,031,603 B1 * | 10/2011 | Polk | ...................... | H04L 1/0045 370/468 |
| 10,761,902 B1 * | 9/2020 | Knaup | .................. | G06F 9/5088 |
| 2001/0032262 A1 * | 10/2001 | Sundqvist | ............. | H04L 47/724 709/227 |
| 2001/0037229 A1 * | 11/2001 | Jacobs | ........... | G06Q 10/063114 705/7.14 |
| 2005/0066331 A1 * | 3/2005 | Inoue | ...................... | G06F 9/505 718/104 |
| 2005/0157644 A1 * | 7/2005 | Johansson | ............. | H04L 47/781 370/229 |
| 2005/0283784 A1 * | 12/2005 | Suzuki | .................. | G06F 9/5044 718/100 |
| 2006/0250961 A1 * | 11/2006 | Vasseur | ................... | H04L 45/50 370/235 |
| 2006/0274650 A1 * | 12/2006 | Tyagi | .................... | H04L 47/724 370/389 |

(Continued)

*Primary Examiner* — Adam Lee
(74) *Attorney, Agent, or Firm* — HAUPTMAN HAM, LLP

(57) ABSTRACT

A method includes receiving a reservation request corresponding to resource requirements of an application and including role-based access and first priority level indicators. A reservation subset of existing reservations is identified based on the role-based access indicator, and server clusters are evaluated based on the resource requirements, the first priority level indicator, the reservation subset, and server cluster resources. When the server clusters are determined to include at least one qualified server cluster, a first server cluster is identified either as a sole qualified server cluster or by ranking multiple qualified server clusters by calculating a score of each qualified server cluster, an existing reservation of the reservation subset assigned to the first server cluster is pre-empted based on the first priority level indicator relative to priority level indicators of the one or more existing reservations, and the reservation request is assigned to the first server cluster.

20 Claims, 7 Drawing Sheets

(56) References Cited

U.S. PATENT DOCUMENTS

| | | | |
|---|---|---|---|
| 2008/0192632 A1* | 8/2008 | Bader | H04L 47/745 370/230.1 |
| 2009/0003202 A1* | 1/2009 | Polk | H04L 47/765 370/229 |
| 2012/0204185 A1 | 8/2012 | Cham et al. | |
| 2013/0111468 A1* | 5/2013 | Davis | G06F 9/5077 718/1 |
| 2017/0147950 A1* | 5/2017 | Carbonell | G06Q 10/02 |
| 2018/0145925 A1* | 5/2018 | Dimitrov | G06F 9/5027 |
| 2018/0165166 A1* | 6/2018 | Wang | G06F 11/2033 |
| 2018/0275910 A1* | 9/2018 | Yokoyama | G06F 3/065 |
| 2019/0245757 A1 | 8/2019 | Meyer et al. | |
| 2020/0250210 A1* | 8/2020 | Busjaeger | G06F 16/162 |
| 2020/0334603 A1 | 10/2020 | Abdollahnejadbarough et al. | |
| 2023/0055276 A1* | 2/2023 | Kaul | G06F 9/44536 |
| 2023/0145437 A1* | 5/2023 | Costa | G06F 9/4887 718/107 |

* cited by examiner

CLOUD-NATIVE APPLICATION RESERVATION MANAGEMENT METHOD AND APPARATUS

BACKGROUND

Telecom (e.g., wireless, cellular, etc.) and other application workloads are increasingly being transitioned to cloud native applications deployed on data centers that include multiple server clusters. The server clusters are capable of having a variety of resources that are often shared among multiple applications.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
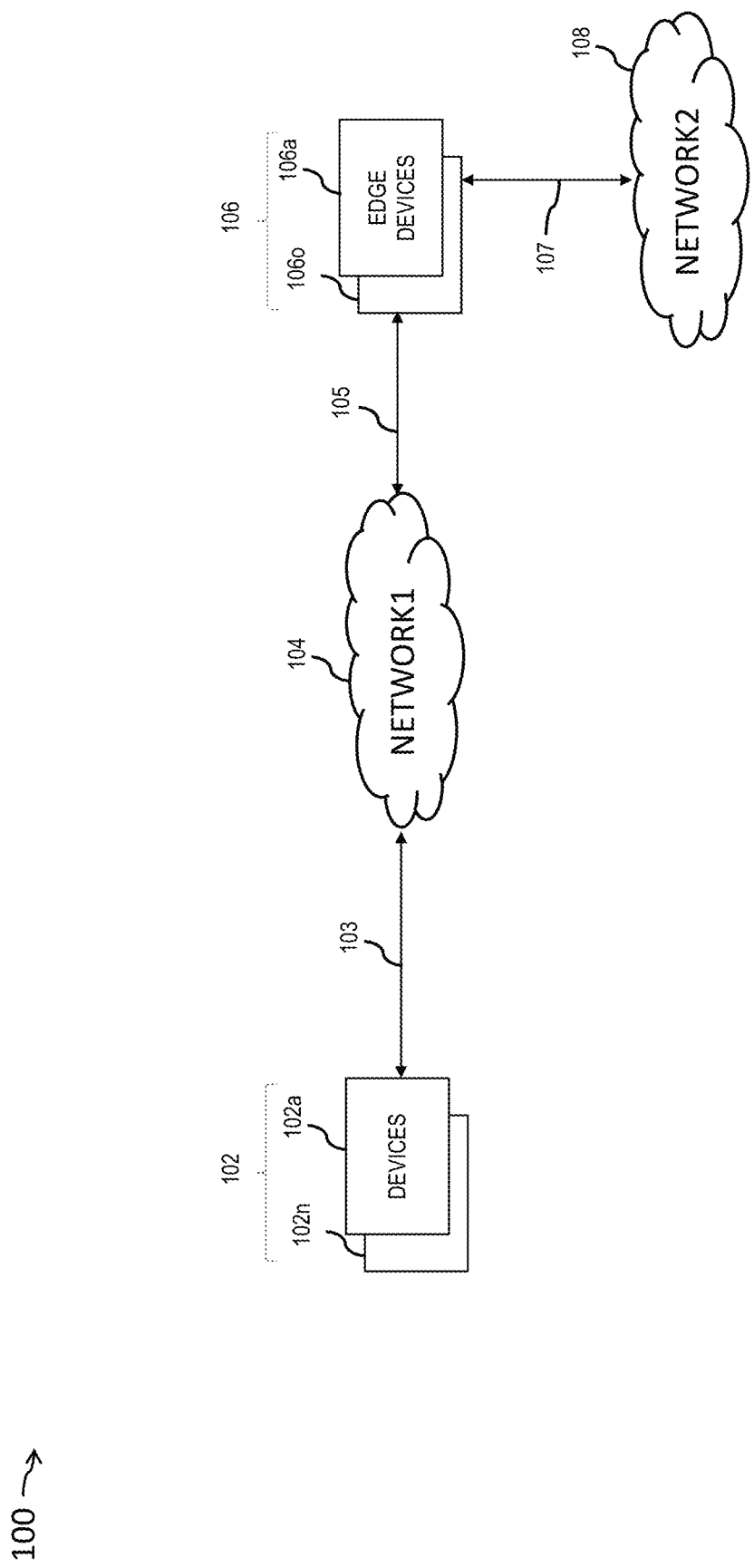
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a method, apparatus, and computer readable medium are directed to automatically receiving a reservation request corresponding to resource requirements of an application, identifying a reservation subset of existing reservations based on a role-based access indicator, and performing a qualification evaluation on a plurality of server clusters based on the resource requirements, the first priority level indicator, the reservation subset, and infrastructure resources of the plurality of server clusters. When the qualification evaluation determines that the plurality of server clusters includes a first subset of at least one qualified server cluster, the method includes identifying a first server cluster of the qualified server clusters, pre-empting one or more existing reservations assigned to the first server cluster, and assigning the reservation request to the first server cluster. In some embodiments, when the qualification evaluation determines that the plurality of server clusters does not include the first subset, the method includes performing a migration qualification evaluation on the plurality of server clusters based on the resource requirements, the infrastructure resources, and the first priority level indicator, and when the migration qualification evaluation determines that the plurality of server clusters includes a second subset of at least one qualified migration server cluster, migrating one or more existing reservations assigned to the second server cluster to a third server cluster, and assigning the reservation request to the second server cluster.

FIG. 1 is a block diagram of a communication system 100 (hereinafter referred to as "system 100"), in accordance with some embodiments.

System 100 includes a set of devices 102 coupled to a network 104 by a link 103, and network 104 is further coupled to a set of edge devices 106 by a link 105. System 100 further includes a network 108 coupled to the set of edge devices 106 by a link 107. The set of edge devices 106 and the set of devices 102 are coupled to each other by network 104.

The set of devices 102 includes devices 102a, 102b, . . . 102n, where n is an integer corresponding to a number of devices in the set of devices 102. In some embodiments, one or more devices in the set of devices 102 corresponds to a computing device, a computing system or a server. In some embodiments, a device 210 (FIG. 2) corresponds to one or more of devices 102a, 102b, . . . 102n of the set of devices 102. In some embodiments, a system 700 (FIG. 7) is an embodiment of one or more of devices 102a, 102b, . . . 102n of the set of devices 102. In some embodiments, the set of devices 102 corresponds to a server farm. In some embodiments, the set of devices 102 corresponds to one or more data centers.

In some embodiments, one or more of devices 102a, 102b, . . . 102n of the set of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of devices 102a, 102b, . . . 102n of the set of devices 102 includes a display by which a user interface is displayed.

Other configurations, different types of devices or other number of sets in the set of devices 102 are within the scope of the present disclosure.

The set of edge devices 106 includes at least edge devices 106a, 106b, . . . 106o, where o is an integer corresponding to a number of edge devices in the set of edge devices 106. In some embodiments, integer o is greater than integer n. In some embodiments, integer o is greater than integer n by at least a factor of 100. In some embodiments, the integer o is greater than integer n by at least a factor of 1000. Other factors are within the scope of the present disclosure.

Figure 2:
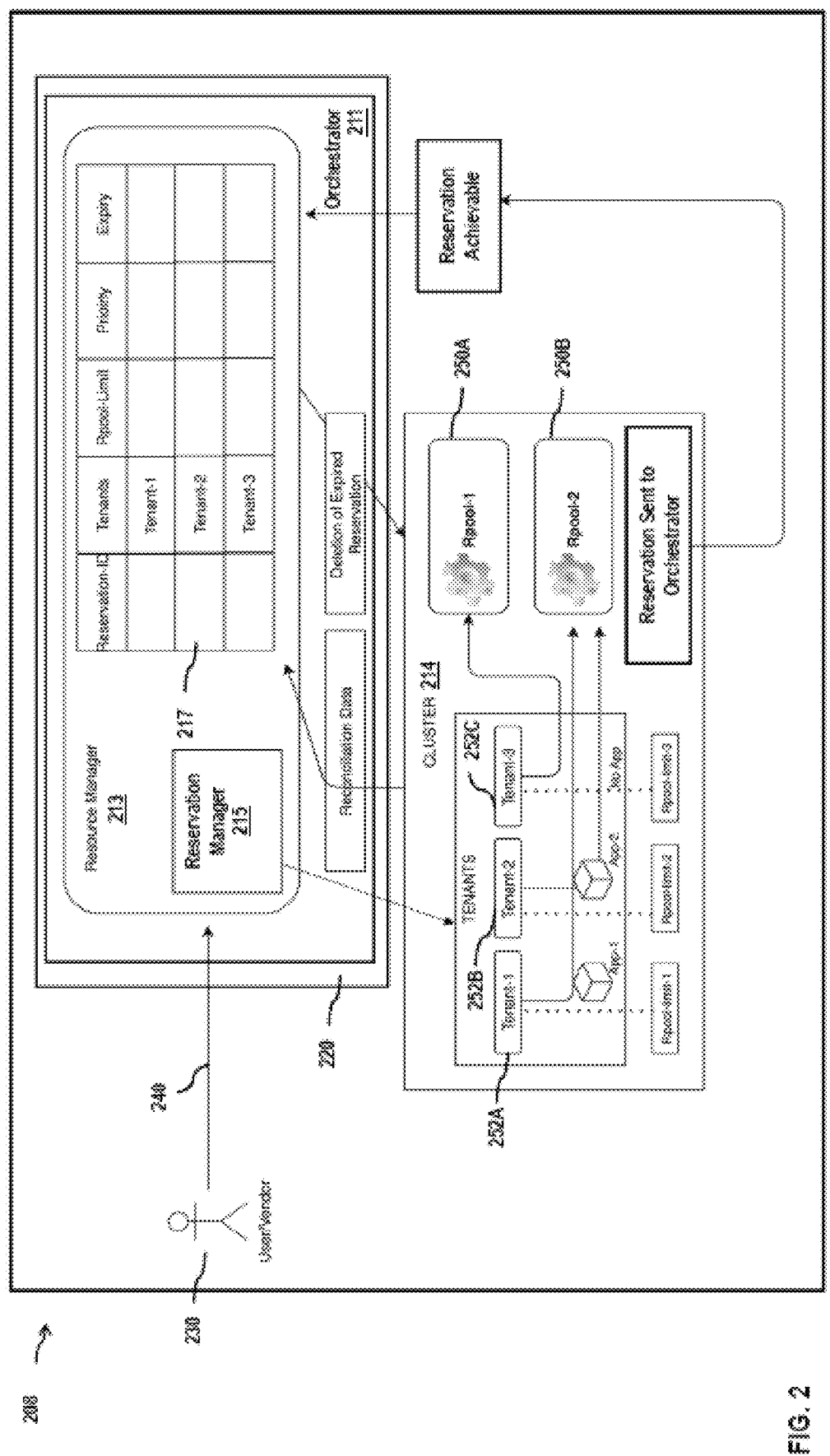
FIG. 2 is a block diagram of a system, in accordance with some embodiments.

In some embodiments, one or more edge devices in the set of edge devices 106 corresponds to a computing device, computing system, or a server. In some embodiments, some or all of the set of edge devices 106 corresponds to one or more server clusters. In some embodiments, the set of edge devices 106 corresponds to a multi-tenant cloud system, e.g., a multi-tenant cloud system 208 (FIG. 2).

A tenant is a user or group of users who share a common access with specific privileges to a software application. With a multitenant architecture, a software application is designed to provide every tenant a dedicated share of the application—including data, configuration, user management, tenant individual functionality and non-functional properties. Multitenancy contrasts with multi-instance architectures in which separate software instances operate on behalf of different tenants. In some embodiments, multi-tenancy is a feature of cloud computing.

Figure 6:
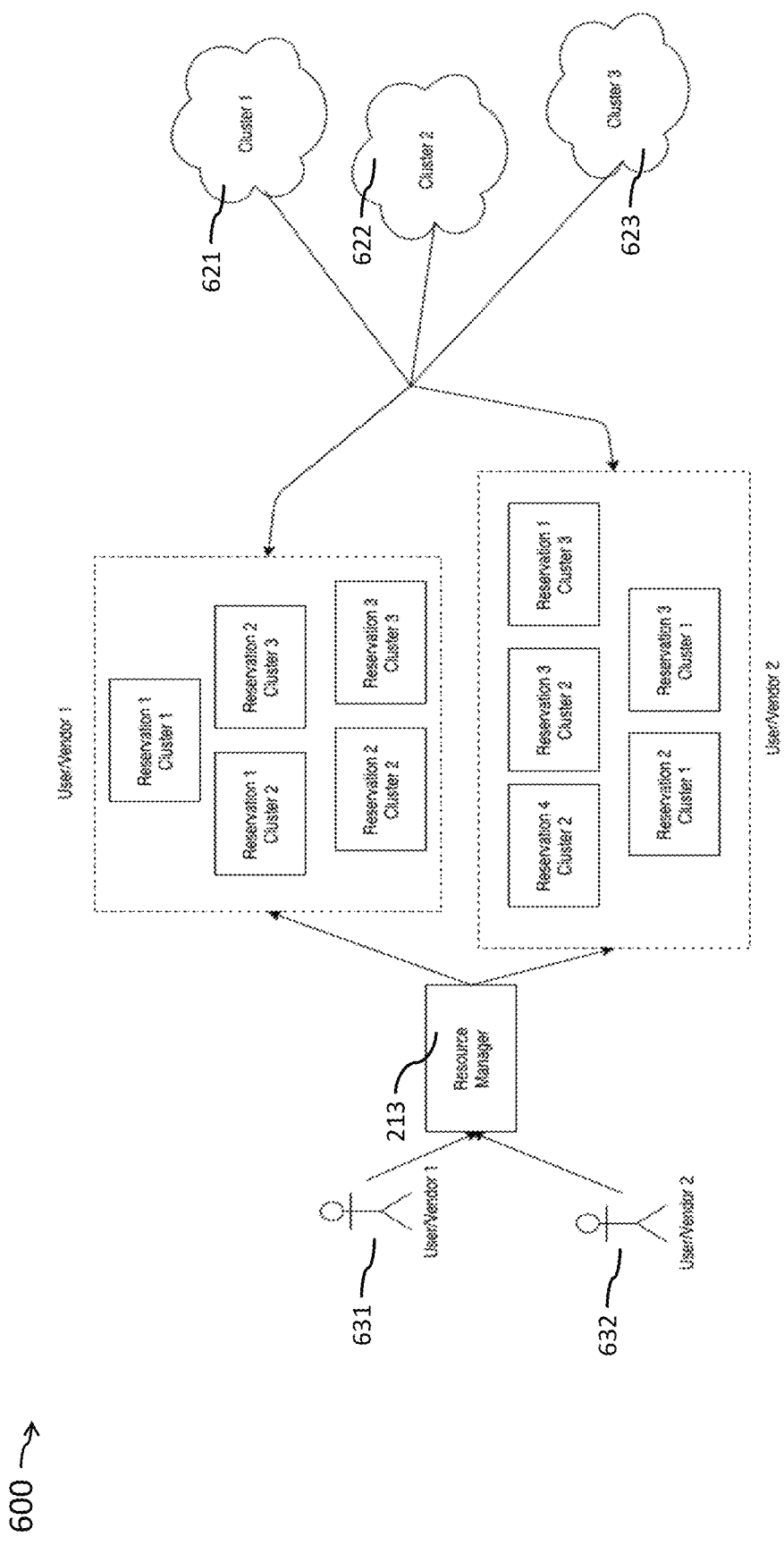
FIG. 6 is a block diagram of a system, in accordance with some embodiments.

In some embodiments, some or all of the set of edge devices 106 corresponds to a server cluster 214 (FIG. 2) or server clusters 421 and 422 (FIG. 4) or 621 and 622 (FIG. 6). In some embodiments, system 700 (FIG. 7) is an embodiment of one or more edge devices 106a, 106b, . . . 106o of the set of edge devices 106.

Other configurations, different types of edge devices or other number of sets in the set of edge devices 106 are within the scope of the present disclosure.

In some embodiments, at least one of network 104 or 108 corresponds to a wired or wireless network. In some embodiments, at least one of network 104 or 108 corresponds to a local area network (LAN). In some embodiments, at least one of network 104 or 108 corresponds to a wide area network (WAN). In some embodiments, at least one of network 104 or 108 corresponds to a metropolitan area network (MAN). In some embodiments, at least one of network 104 or 108 corresponds to an internet area network (IAN), a campus area network (CAN) or a virtual private networks (VPN). In some embodiments, at least one of network 104 or 108 corresponds to the Internet.

Other configurations, number of networks or different types of network in at least network 104 or 108 are within the scope of the present disclosure.

In some embodiments, at least one of link 103, 105, or 107 is a wired link. In some embodiments, at least one of link 103, 105, or 107 is a wireless link. In some embodiments, at least one of link 103, 105, or 107 corresponds to any transmission medium type; e.g. fiber optic cabling, any wired cabling, and any wireless link type(s). In some embodiments, at least one of link 103, 105, or 107 corresponds to shielded, twisted-pair cabling, copper cabling, fiber optic cabling, and/or encrypted data links.

In some embodiments, at least one of link 103, 105, or 107 is based on different technologies, such as code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least one of link 103, 105, or 107 are within the scope of the present disclosure. For example, while FIG. 1 shows a single link for each of links 103, 105, and 107, one or more of links 103, 105, or 107 include a plurality of links.

Other configurations or number of elements in system 100 are within the scope of the present disclosure.

FIG. 2 is a block diagram of a system 208, in accordance with some embodiments. FIG. 2 is simplified for the purpose of illustration.

System 208 is an embodiment of multi-tenant cloud system 208, an example of the set of edge devices 106, and similar detailed description is omitted.

Multi-tenant cloud system 208 includes a device 220 connected to a server cluster 214. In some embodiments, sever cluster 214 is an example of some or all of the set of edge devices 106 and similar detailed description is omitted. In some embodiments, server cluster 214 is a Kubernetes-based platform that automates the deployment, scaling and lifecycle management of data and network intensive applications. In some embodiments, server cluster 214 ships pure open-source Kubernetes in a batteries included, but replaceable, packaging mode. In some embodiments, server cluster 214 support the open-source Kubernetes that is shipped with the product and provides automated installation, frequent upgrades, and monitoring. However, one may choose to replace the built-in open-source Kubernetes with cloud-native computing foundation (CNCF)-certified Kubernetes (including on-premises or cloud-vendor distributions) or any other suitable system.

In some embodiments, Kubernetes is an open-source container-orchestration system for automating computer application deployment, scaling, and management maintained by CNCF. In some embodiments, Kubernetes aims to provide a platform for automating deployment, scaling, and operations of database management systems. In some embodiments, Kubernetes works with a range of container tools and runs containers in a cluster, such as cluster 214. Many cloud services offer a Kubernetes-based platform or infrastructure as a service (platform as a service (PaaS) or infrastructure as a service (IaaS)) on which Kubernetes can be deployed as a platform-providing service.

In some embodiments, PaaS or application platform as a service (aPaaS) or platform-based service is a category of cloud computing services that allows customers to provision, instantiate, run, and manage a modular bundle comprising a computing platform and one or more applications, without the complexity of building and maintaining the infrastructure typically associated with developing and launching the application(s); and to allow developers to create, develop, and package such software bundles. In some embodiments, IaaS are online services that provide high-level application programming interfaces (APIs) used to defer various low-level details of underlying network infrastructure like physical computing resources, location, data partitioning, scaling, security, backup etc. A hypervisor, such as Xen, Oracle VirtualBox, Oracle VM, KVM, VMware ESX/ESXi, or Hyper-V runs the virtual machines as guests. Pools of hypervisors within the cloud operational system can support large numbers of virtual machines and the ability to scale services up and down according to customers' varying requirements.

In some embodiments, cloud native computing is an approach in software development that utilizes cloud computing to build and run scalable applications in modern, dynamic environments such as public, private, and hybrid clouds, such as multi-tenant cloud system 208. Technologies such as containers, microservices, serverless functions and immutable infrastructure, deployed via declarative code are common elements of this architectural style that enable loosely coupled systems that are resilient, manageable, and observable. In some embodiments, cloud-native applications are built as a set of microservices that run in Docker containers, and are orchestrated in Kubernetes. The container runs in a virtualized environment, which isolates the contained application from the environment.

In some embodiments, server cluster 214 is a set of servers that work together so that they are viewed as a single system. In some embodiment, server clusters 214 have an application(s) deployed on each node to perform the same task, controlled and scheduled by software.

FIG. 2 depicts multi-tenant cloud system 208 including a single server cluster 214 for the purpose of illustration. In some embodiments, e.g., systems 400-600 discussed below with respect to FIGS. 4-6, system 208 includes one or more server clusters (not shown) in addition to server cluster 214.

Figure 3:
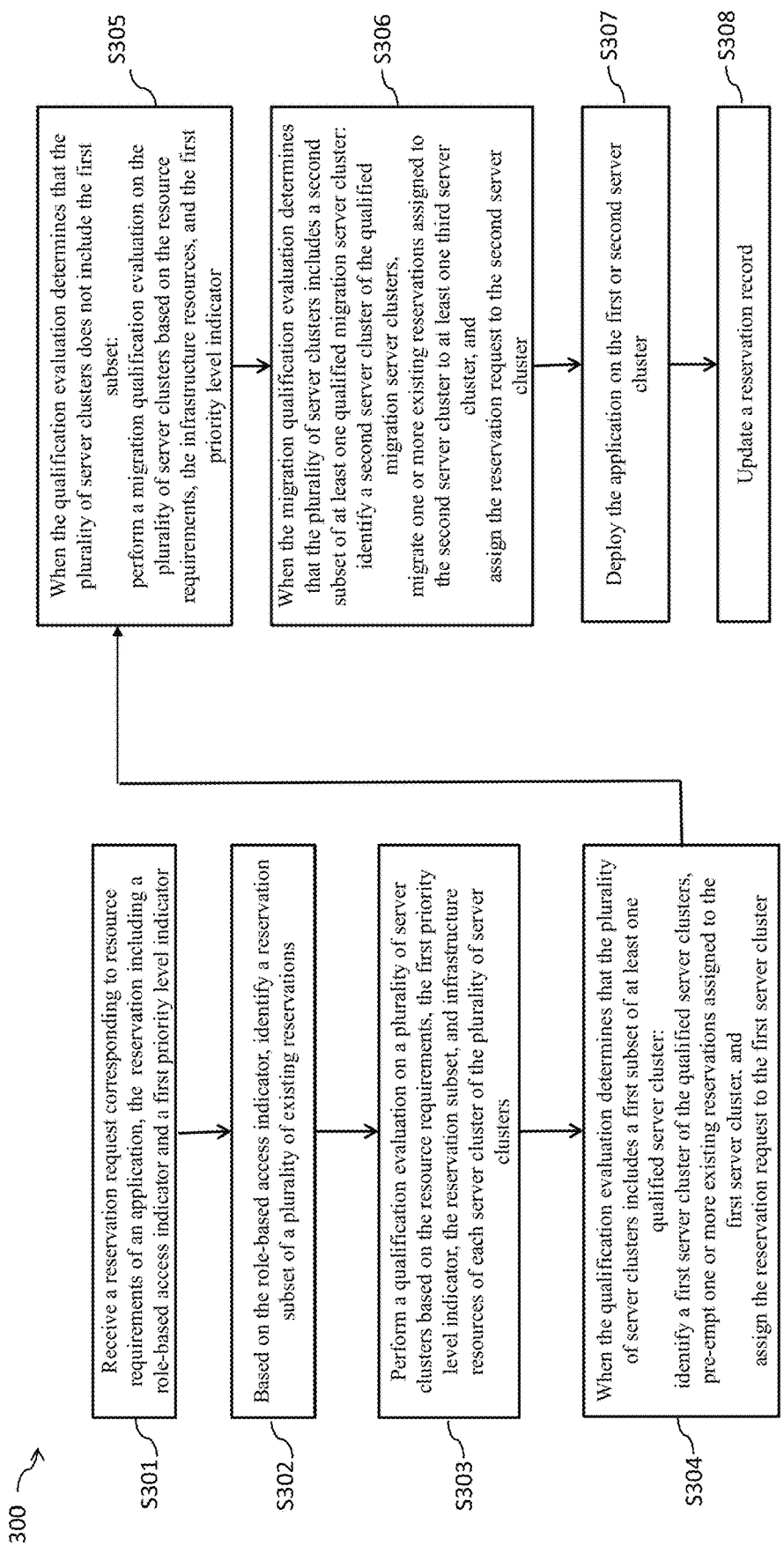
FIG. 3 is a flowchart of a method, in accordance with some embodiments.

In some embodiments, multi-tenant cloud system 208 is configured to perform a series of steps or operations (e.g., S301, S302, and S303-S308) as described in FIG. 3 as a method 300.

Device 220 is coupled to server cluster 214 by a network (not shown), such as network 104, a cloud network, or a data center.

Device 220 is configured to receive one or more reservation requests, e.g., a reservation request 240, from one or more users (represented collectively as user 230). The reservation requests correspond to one or more software applications (not shown) and include information indicative of server cluster resource requirements of the corresponding applications.

Device 220 is configured to automatically deploy the one or more software applications on the corresponding server clusters, e.g., server cluster 214. The server clusters are configured to store, execute and provide access to the one or more deployed applications by network 104 and 108 to other devices (including the set of devices 102).

Server cluster 214 is a logical entity of a group of servers, e.g., a group of servers collectively controlled for efficiency and/or to provide backup or other capabilities. Multiple instances of server cluster 214 and/or other server clusters are located in data centers (not shown), each data center including at least one server cluster, e.g., server cluster 214. In some embodiments, system 208 includes tens of data centers. In some embodiments, system 208 includes hundreds or thousands of data centers.

In some embodiments, a given data center includes tens of instances of server clusters, e.g., server cluster 214. In some embodiments, a given data center includes hundreds or thousands of instances of server clusters, e.g., server cluster 214.

In some embodiments, system 208 includes a total number of server clusters, e.g., server cluster 214, ranging from tens of server clusters to hundreds of thousands of server clusters. In some embodiments, system 208 includes the total number of server clusters, e.g., server cluster 214, ranging from hundreds of server clusters to thousands of server clusters. In some embodiments, data centers and the corresponding server clusters, e.g., server cluster 214, are referred to as an ecosystem.

Resource capabilities of the server clusters, also referred to as infrastructure resources in some embodiments, correspond collectively to resource requirements of the one or more software applications and include one or more of a memory requirement/capability, a storage requirement/capability, a central processing unit (CPU) requirement/capability, a supplemental processing requirement/capability, an input-output (I/O) or other hardware interface requirement/capability, a software requirement/capability, a user-specified requirement/capability, or other technical requirement and/or capability suitable for storing and/or executing software applications.

In some embodiments, a memory requirement/capability includes one or more of a memory size, type, configuration, or other criteria suitable for defining computer memory capabilities, e.g., gigabytes (GB) of random-access memory (RAM). A storage requirement/capability includes one or more of a storage type, e.g., hard disk drive (HDD) or solid state drive (SSD), size, configuration, or other criteria suitable for defining data storage capabilities.

In some embodiments, a CPU requirement/capability includes one or more of a number of physical or virtual processor cores, processor speed, or other criteria suitable for defining general computer processing capabilities. A supplemental processing requirement/capability includes one or more application-specific computational requirements/capabilities, e.g., a graphics processing unit (GPU) requirement/capability, a field-programmable gate array (FPGA) requirement/capability, or other requirement/capability provided by hardware supplemental to general processing hardware.

In some embodiments, an I/O or other hardware interface requirement/capability includes one or more of a network interface card (NIC), a single root I/O virtualization (SRIOV), open virtual switch (OVS), or other criteria suitable for defining interfacing capabilities.

In some embodiments, a software requirement/capability includes one or more of an operating system (OS) requirement/capability, e.g., an OS type and/or version, an application programming interface (API) requirement/capability, or other supplemental software requirement/capability.

In some embodiments, a user-specified requirement/capability includes one or more of a geographic location or region, e.g., a country, including one or more server clusters, e.g., server cluster 220, a data center type such as a group center (GC) type corresponding to far edge data centers, a regional data center (RDC) type corresponding to near edge data centers, or a central data center (CDC) type corresponding to centrally located data centers, or other criteria provided by a user suitable for specifying a data center or server cluster technical requirement/capability.

In some embodiments, an other technical requirement/capability includes one or more of a tag identifying a server cluster and/or data center type, or other application-specific criteria suitable for identifying server cluster compatibility.

In some embodiments, reservation request 240 corresponds to a telecommunication (Telco) application configured to execute on one or more of the server clusters including server cluster 220 and corresponding to one or more private, application-specific environments, e.g., a virtual radio access network (vRAN). In some embodiments, the resource requirements corresponding to reservation request 240 include one or more FPGA and/or hardware interface requirements corresponding to a Telco application.

A vRAN is part of a mobile telecommunication system. In some embodiments, vRAN implements a radio access technology. In some embodiments, vRAN resides between devices such as a mobile phone, a computer, or any remotely controlled machine, such as devices 102, and provides connection with a core network (CN). In some embodiments, depending on the standard, mobile phones and other wireless connected devices are varyingly known as user equipment (UE), terminal equipment, mobile station (MS), etc. In some embodiments, vRAN functionality is provided by a silicon chip residing in both the core network as well as the user equipment.

Device 220 includes an orchestrator 211. Orchestrator 211 is one or more sets of instructions, e.g., program code, configured to automatically provision, orchestrate, manage, and deploy the one or more software applications on the server clusters including server cluster 214. Orchestrator 211 is configured to automatically retrieve resource requirements of the application, e.g., from a service catalog (not shown), and includes a resource manager 213 which further includes a reservation manager 215 configured to match the resource requirements to infrastructure resources and track resource allocations, e.g., in a reservation record 217, as discussed below.

In some embodiments, orchestrator 211 of device 220 is the sole orchestrator of a particular ecosystem, e.g., system 208. In some embodiments, orchestrator 211 of device 220 is one of multiple orchestrators 211 of corresponding multiple devices 220 of a particular ecosystem.

Orchestrator 211 includes a user interface, e.g., a user interface 722 discussed below with respect to FIG. 7, capable of displaying information to user 230, and receiving reservation requests including reservation request 240 from user 230. In some embodiments, user 230 represents a single user. In some embodiments, user 230 represents multiple users.

Orchestrator 211 is configured to store and update information related to user 230 and reservation requests including reservation request 240 in reservation record 217. In some embodiments, reservation record 217 is included in one or more storage devices configured to store information related to various additional functions of orchestrator 211, e.g., a service catalog or server cluster database. In some embodiments, reservation record 217 is included in one or more storage devices independent of additional functions of orchestrator 211. In some embodiments, reservation record 217 includes a database. In the embodiment depicted in FIG. 2, reservation record 217 is located in device 220. In some embodiments, reservation record 217 is located partially or entirely external to device 220, e.g., on another device 102 or on an edge device 106.

Reservation record 217 includes data corresponding to users of device 220, e.g., user 230, and other data suitable for scheduling and maintaining various application reservations on the ecosystem including device 220. Each user is associated with a particular vendor, and each vendor includes one or more tenants, e.g., Tenant-1 252A, Tenant-2 252B, and Tenant-3 252C depicted in FIG. 2, each of which includes one or more users such as user 230. Users and resource reservations are managed at the tenant level, and tenant-level access is referred to as role-based access in some embodiments.

Resource manager 213 of orchestrator 211 includes reservation manager 215 configured to manage existing and requested resource allocations of the server clusters in accordance with method 300 discussed below. To perform the relevant operations of method 300, reservation manager 215 tracks resource requests and reservations at the tenant level as illustrated in FIG. 2.

In the embodiment depicted in FIG. 2, system 208 includes three tenants and a single server cluster 214 for the purpose of illustration. In some embodiments, system 208 includes fewer or greater than three tenants and/or greater than a single server cluster.

In some embodiments, system 208 is a multi-tenant cloud system. In some embodiments, a multi-tenant cloud system is a cloud computing system that allows multiple users, such as user 230, to share computing resources via a cloud network (e.g., public cloud, private cloud, hybrid cloud, and the like). In some embodiments, multi-tenancy of cloud system 208 makes a greater pool of resources available to a larger group of users than in other approaches.

In some embodiments, a multi-tenant cloud system 208 includes a server cluster 214 comprising multiple resource pools 250A, 250B and multiple tenants 252A, 252B, 252C (e.g., computing resources or applications utilized by different users, and the like); and resource manager 213 performing tasks such as: managing resources request from a user, such as user 230, (e.g., a vendor, a service provider, an individual user, and the like), communicating with cluster 214 to determine available resources, and allocate the resources to user 230.

In the embodiment depicted in FIG. 2, a given user, e.g., user 230, has (role-based) access associated with a corresponding one of tenants Tenant-1 252A, Tenant-2 252B, or Tenant-3 252C. Each one of tenants Tenant-1 252A, Tenant-2 252B, and Tenant-3 252C has a corresponding cumulative resource limit Rpool-limit-1 or Rpool-limit-2 (Rpool-Limit in reservation record 217). Cumulative resource limits Rpool-limit-1 and Rpool-limit-2 define upper limits of the combined resources allocated to the users associated with the corresponding tenants Tenant-1 252A, Tenant-2 252B, and Tenant-3 252C. In various embodiments, the allocated resources include one or both of reserved resources assigned to existing resource reservations or resources on which applications have been deployed. In some embodiments, reservation manager 215 is dependent on the limits, such as Rpool-limit-1 and Rpool-limit-2, the Rpool resources to each tenant, such as Tenant-1 252A, Tenant-2 252B, and Tenant-3 252C. In some embodiments, a threshold, such as the Rpool-limits, for each tenant and each tenant's resources is set so the tenant does not exceed a specific value. In some embodiments, the Rpool limits are configured to ensure that applications are deployed with an acceptable amount of resources and does not exceed the acceptable amount of resources.

Resource manager 213 is configured to receive reservation request 240 including a role-based indicator, e.g., a Reservation-ID, usable for identifying one of tenants Tenant-1 252A, Tenant-2 252B, or Tenant-3 252C. In some embodiments, the role-based indicator corresponds to login or other credentials of user 230. In some embodiments, the role-based indicator corresponds to reservation request 240 or the software application associated with reservation request 240.

Reservation manager 215 is configured to determine cumulative resource requirements corresponding to each of tenants Tenant-1 252A, Tenant-2 252B, and Tenant-3 252C, e.g., in response to receiving reservation request 240, and compare the cumulative resource requirements to the corresponding cumulative resource limit Rpool-limit-1 or Rpool-limit-2.

Reservation manager 215 is also configured to manage reservation record 217 including priority level indicators Priority capable of specifying priority levels of reservation request 240 and one or more existing reservations pertaining to the plurality of server clusters including server cluster 214.

In some embodiments, e.g., systems 400 and 500 discussed below with respect to FIGS. 4 and 5, priority level indicators Priority are non-negative integer values in which a relatively lower priority level indicates a relatively higher priority reservation and a relatively higher priority level indicates a relatively lower priority reservation. In some embodiments, the non-negative integer values range from 0 to 10 with 0 indicating the highest priority and 10 indicating the lowest priority.

Other configurations of priority level indicators Priority are within the scope of the various embodiments, e.g., non-negative integer values in which a relatively lower priority level indicates a relatively lower priority reservation and a relatively higher priority level indicates a relatively higher priority reservation.

In some embodiments, priority level indicators Priority are assigned by user 230 concurrently with reservation manager 215 receiving reservation requests, e.g., reservation request 240. In some embodiments, priority level indicators Priority are stored values, e.g., previously defined by user 230 or a tenant-level or vendor-level administrator. In some embodiments, reservation manager 215 assigns a default value, e.g., 5, to a priority level indicator Priority in the absence of a user assignment and/or predetermined value.

Reservation manager 215 is configured to manage reservation record 217 including expiration dates Expiry capable of specifying dates upon which the one or more existing reservations pertaining to the plurality of server clusters including server cluster 214 stand invalid. In some embodiments, reservation manager 215 is configured to automatically cancel an existing reservation on the date specified by expiration date Expiry. In some embodiments, reservation manager 215 is configured to automatically alter a status of an existing reservation on the date specified by expiration date Expiry without cancelling the existing reservation. In some embodiments, reservation manager 215 is configured to automatically cancel an existing reservation on a date corresponding to a predetermined time period following the date specified by expiration date Expiry.

In some embodiments, expiration dates Expiry are assigned by user 230 concurrently with reservation manager 215 receiving reservation requests, e.g., reservation request 240. In some embodiments, expiration dates Expiry are stored values, e.g., previously defined by user 230 or a tenant-level or vendor-level administrator. In some embodiments, reservation manager 215 assigns a default value, e.g., a date corresponding to a predetermined number of days subsequent to a reservation assignment, to an expiration date Expiry in the absence of a user assignment and/or predetermined value.

In the non-limiting example depicted in FIG. 2, resource capabilities of server cluster 220 are grouped into resource pools Rpool-1 and Rpool-2. Each of an existing reservation for application App-1 corresponding to tenant Tenant-1 252A and an existing reservation for application App-2 corresponding to tenant Tenant-2 252B is assigned to resource pool Rpool-2, and resource pool Rpool-1 is available for reservation requests corresponding to tenant Tenant-3.

Reservation manager 215 is configured to update reservation record 217 to reflect changes in hardware and software capacities of the server clusters including server cluster 214 corresponding to reservation assignments and software application deployment.

FIG. 3 is a flowchart of method 300, in accordance with some embodiments.

In some embodiments, method 300 is a method of receiving a reservation request, identifying a reservation subset of a plurality of existing reservations, performing a qualification evaluation on a plurality of server clusters, identifying a first server cluster of the qualified server clusters, potentially pre-empting an existing reservation assigned to the first server cluster and assigning the reservation request to the first server cluster, or potentially performing a migration qualification evaluation on the server clusters, migrating an existing reservation from a second server cluster to a third server cluster, and assigning the reservation request to the second server cluster. In some embodiments, at least portions of method 300 are performed by orchestrator 211, resource manager 213, and/or reservation manager 215.

In some embodiments, FIG. 3 is a flowchart of a method of operating system 100 of FIG. 1 or system 208 of FIG. 2, and similar detailed description is therefore omitted. It is understood that additional operations may be performed before, during, between, and/or after the operations of method 300 depicted in FIG. 3, and that some other operations may only be briefly described herein. In some embodiments, other orders of operations of method 300 are within the scope of the present disclosure. In some embodiments, one or more operations of method 300 are not performed.

Method 300 includes exemplary operations, but the operations are not necessarily performed in the order shown. Operations may be added, replaced, changed order, and/or eliminated as appropriate, in accordance with the spirit and scope of disclosed embodiments.

In operation S301 of method 300, reservation request 240 corresponding to resource requirements of an application is received by reservation manager 215 of resource manager 213. Receiving reservation request 240 includes receiving a role-based access indicator, e.g., Reservation-ID, and a first priority level indicator, e.g., Priority. In some embodiments, reservation request 240 is received from user 230.

In some embodiments, receiving reservation request 240 includes the resource requirements including one or more of a server cluster tag, a location requirement, a CPU requirement, a GPU requirement, a memory requirement, a HDD storage requirement, or a SSD storage requirement.

In operation S302 of method 300, based on the role-based access indicator, a reservation subset of a plurality of existing reservations is identified. In some embodiments, identifying the reservation subset includes matching the role-based indicator of the reservation request, e.g., Reservation-ID, with role-based indicators of existing reservations of the plurality of existing reservations, e.g., corresponding to one of tenants Tenant-1 252A, Tenant-2 252B, or Tenant-3 252C. In some embodiments, identifying the reservation subset includes confirming that the resource requirements of the application added to cumulative resource requirements of the plurality of existing reservations do not exceed a resource pool limit, e.g., one of resource pool limits Rpool-limit-1 or Rpool-limit-2.

In operation S303 of method 300, a qualification evaluation on a plurality of server clusters, e.g., including server cluster 214, is performed by resource manager 215 based on the resource requirements, the first priority level indicator, the reservation subset, and infrastructure resources of each server cluster of the plurality of server clusters.

Performing the qualification evaluation includes comparing the first priority level indicator to priority level indicators of existing reservations of the reservation subset assigned to each server cluster of the plurality of server clusters. For a given server cluster, a total resource capability is determined as the unassigned resources added to the resource capabilities of all the reservations with a lower priority ranking than that of the reservation request, as determined by comparing the first priority level indicator to the priority level indicators of the existing reservations of the reservation subset assigned to the server cluster. If the total resource capability is greater than the resource requirements of the reservation request, the given server cluster is determined to be a qualified server cluster.

Performing the qualification evaluation includes performing the qualification evaluation on each server cluster of the plurality of server clusters.

In some embodiments, performing the qualification evaluation includes first filtering the plurality of server clusters based on one or more server cluster tags and/or location requirements included in or associated with the reservation request.

In operation S304 of method 300, when the qualification evaluation determines that the plurality of server clusters includes a first subset of at least one qualified server cluster, a first server cluster of the qualified server clusters is identified, one or more existing reservations assigned to the first server cluster is pre-empted, and the reservation request is assigned to the first server cluster.

Identifying the first server cluster of the qualified server clusters includes identifying the first server cluster either as a sole qualified server cluster of the first subset or by ranking multiple qualified server clusters of the first subset by calculating a first score of each qualified server cluster of the first subset.

Calculating the first score includes summing differences between server cluster capacity and the resource requirements for each requirement of a plurality of requirements of the reservation request, e.g., reservation request 240. In some embodiments, summing the differences includes calculating the first score as $$\text{Score} = \Sigma_{d \in D}(Cd - Rd)/Cd \tag{1}$$

where C=allocatable cumulative (aggregate) capacity of the cluster, R=requested resources for the application, and D={vCPU, GPU, RAM, STORAGE_SSD, STORAGE_HDD_}. In this non-limiting example, vCPU corresponds to a processor requirement/capability, GPU corresponds to a graphical processor requirement/capability, RAM corresponds to a memory requirement/capability, STORAGE_SSD corresponds to an SSD storage requirement/capability, and STORAGE_HDD corresponds to an HDD storage requirement/capability.

Identifying the first server cluster of the qualified server clusters by ranking multiple qualified server clusters includes sorting the first scores for each server cluster of the first subset in ascending order and assigning the server cluster having the highest first score as the first server cluster.

In some embodiments, identifying the first server cluster includes determining that a server cluster initially assigned as the first server cluster is not a qualified server cluster, and assigning a server cluster having a lower, e.g., next-highest, score as the first server cluster.

In some embodiments, assigning the server cluster having the highest first score as the first server cluster includes assigning multiple server clusters having highest first scores as multiple first server clusters. In some embodiments, identifying the first server cluster of the qualified server clusters includes providing a choice of the multiple first server clusters to user 230 and receiving a selection of the first server cluster from user 230.

Pre-empting the one or more existing reservations assigned to the first server cluster is based on a first priority ranking of the first priority level indicator being higher than one or more priority rankings corresponding to the priority level indicators of the one or more existing reservations.

Pre-empting the one or more existing reservations includes applying a pre-emption order to the one or more existing reservations having priority rankings lower than the first priority ranking. In various embodiments, applying the pre-emption order includes the order being determined by the expiration date, the number of allocated resources, or from lowest priority ranking to highest priority ranking.

In some embodiments, an order determination policy is assigned by user 230 concurrently with reservation manager 215 receiving reservation requests, e.g., reservation request 240. In some embodiments, the order determination policy is stored information, e.g., previously defined by user 230 or a tenant-level or vendor-level administrator.

Pre-empting the one or more existing reservations includes pre-empting a number of existing reservations necessary to accommodate reservation request 240.

Figure 4:
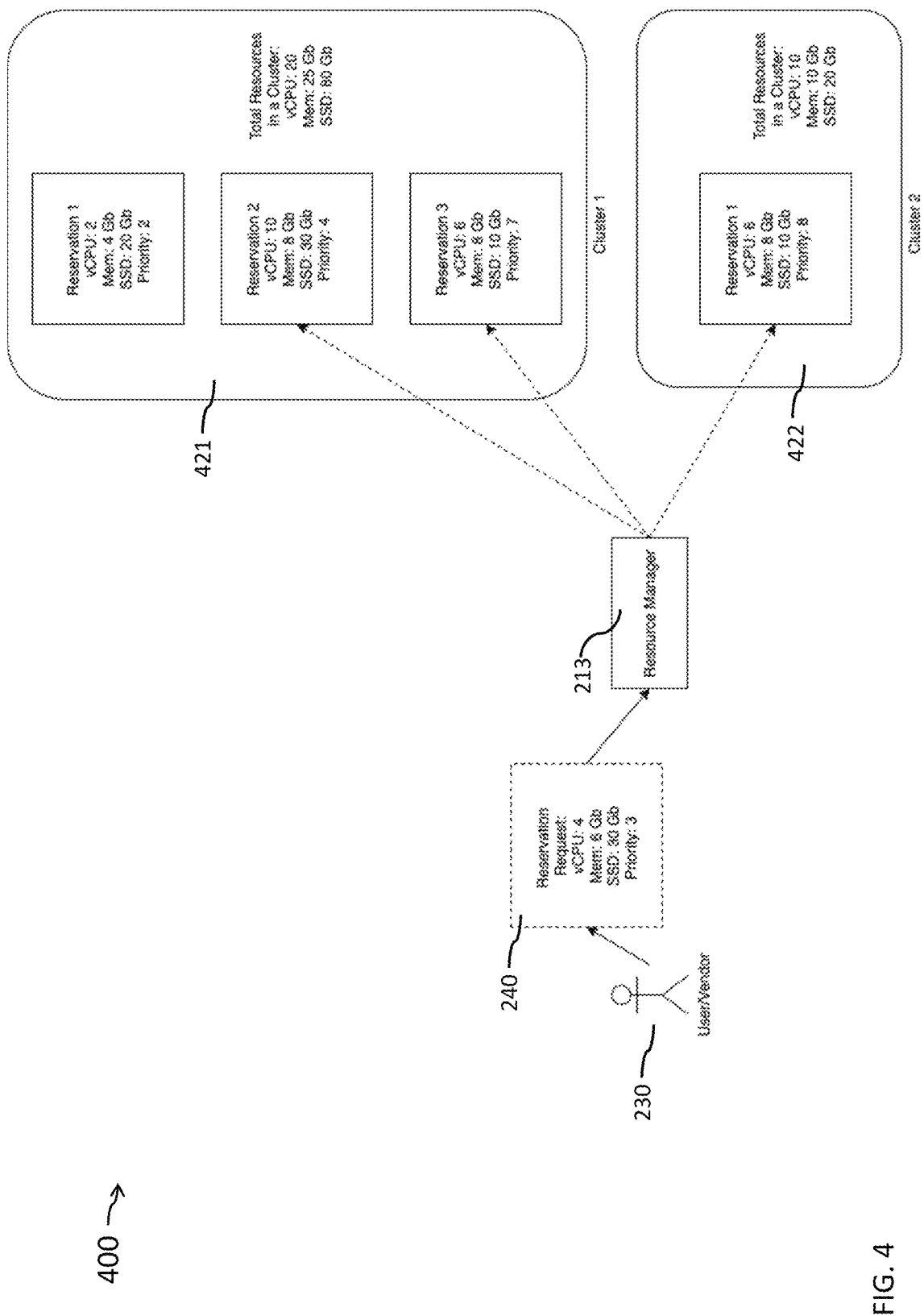
FIG. 4 is a block diagram of a system, in accordance with some embodiments.

FIG. 4 depicts a non-limiting example of system 400 including resource manager 213 (other details of device 220 omitted for the purpose of illustration) and sever clusters 421 and 422. In this example, priority level indicators are non-negative integer values in which a relatively lower priority level indicates a relatively higher priority reservation and a relatively higher priority level indicates a relatively lower priority reservation.

Reservation request 240 received from user 230 includes the indicated resource requirements and a priority level indicator of 3. Existing reservation Reservation 1 of server cluster 421 has a priority level indicator of 2, existing reservation Reservation 2 of server cluster 421 has a priority level indicator of 4, existing reservation Reservation 3 of server cluster 421 has a priority level indicator of 7, and existing reservation Reservation 1 of server cluster 422 has a priority level indicator of 8.

Based on the resource requirements and priority level indicator of reservation request 240, each of Reservation 2 of server cluster 421, Reservation 3 of server cluster 421, and Reservation 1 of server cluster 422 is eligible to be pre-empted by reservation request 240. In this example, the choice of server cluster 421 or 422 is provided to user 230. If user 230 selects server cluster 421 as the first server cluster, one of Reservation 2 or Reservation 3 is pre-empted based on the user-defined policy, and reservation request 240 is assigned to server cluster 421. If user 230 selects server cluster 422 as the first server cluster, Reservation 1 is pre-empted and reservation request 240 is assigned to server cluster 422.

In operation S305 of method 300, in some embodiments, when the qualification evaluation determines that the plurality of server clusters does not include the first subset, a migration qualification evaluation is performed on the plurality of server clusters based on the resource requirements, the infrastructure resources, and the first priority level indicator.

Performing the migration qualification evaluation includes comparing the first priority level indicator to priority level indicators of one or more existing reservations of the reservation subset assigned to each server cluster of the plurality of server clusters. For a given server cluster, a migration resource capability is determined as the unassigned resources added to the resource capabilities of all the reservations with an equal or higher priority ranking than that of the reservation request, as determined by comparing the first priority level indicator to the priority level indicators of the existing reservations of the reservation subset assigned to the server cluster. If the migration resource capability is greater than the resource requirements of the reservation request, the given server cluster is determined to be a qualified migration server cluster.

In some embodiments, performing the qualification evaluation includes performing the qualification evaluation on each server cluster of the plurality of server clusters. In some embodiments, performing the qualification evaluation includes performing the qualification evaluation on a limited number of server clusters, e.g., 50 server clusters, of the plurality of server clusters. In some embodiments, performing the qualification evaluation includes performing the qualification evaluation on the limited number received from user 230 or based on a default value.

In some embodiments, performing the migration qualification evaluation includes receiving an enable indicator from user 230, thereby overriding a default setting configured to disable performing the migration qualification.

In some embodiments, performing the migration qualification evaluation includes first filtering the plurality of server clusters based on one or more server cluster tags and/or location requirements included in or associated with the reservation request.

In some embodiments, operations S303 and S304 are not performed, and the migration qualification evaluation is performed on the plurality of server clusters without the qualification evaluation determining that the plurality of server clusters does not include the first subset.

In operation S306 of method 300, in some embodiments, when the migration qualification evaluation determines that the plurality of server clusters includes a second subset of at least one qualified migration server cluster, a second server cluster of the qualified migration server clusters is identified, one or more existing reservations assigned to the second server cluster are migrated to at least one third server cluster, and the reservation request is assigned to the second server cluster.

Identifying the second server cluster of the qualified server clusters includes identifying the second server cluster either as a sole qualified migration server cluster of the second subset or by ranking multiple qualified migration server clusters of the second subset by calculating a second score of each qualified migration server cluster of the second subset. Calculating the second score is performed in the manner discussed above with respect to using equation 1 to calculate the first score in operation S304.

Identifying the second server cluster of the qualified migration server clusters by ranking multiple qualified migration server clusters includes sorting the second scores for each server cluster of the second subset in ascending order and assigning the server cluster having the highest second score as the second server cluster.

In some embodiments, assigning the server cluster having the highest first score as the second server cluster includes assigning multiple server clusters having highest second scores as multiple second server clusters. In some embodiments, identifying the second server cluster of the qualified migration server clusters includes providing a choice of the multiple second server clusters to user 230 and receiving a selection of the second server cluster from user 230.

Migrating the one or more existing reservations assigned to the second server cluster is based on a first priority ranking of the first priority level indicator being lower than or equal to one or more priority rankings corresponding to the priority level indicators of the one or more existing reservations.

For each existing reservation assigned to the second server cluster and having the priority ranking equal to or higher than the first priority ranking, a destination qualification is performed using tags, locations, role-based access, and resource requirements of the existing reservation. If the destination qualification determines that the plurality of server clusters includes one or more third server clusters, the one or more third server clusters are marked as potential destination clusters that satisfy the qualification criteria.

If the server cluster initially assigned as the second server cluster is determined to not be a qualified migration server cluster, e.g., as a result of the destination qualification, a server cluster having the next-highest score is assigned as the second server cluster.

The destination qualification is repeated for each server cluster in the second subset until a qualified migration server cluster is assigned as the second server cluster or a determination is made that no possible migration path exists.

If a determination is made that a possible migration path exists, migrating the one or more existing reservations includes applying a migration order to the one or more existing reservations having priority rankings equal to or higher than the first priority ranking. In various embodiments, applying the migration order includes the migration order being determined by the expiration date, the number of allocated resources, or from lowest priority ranking to highest priority ranking.

In some embodiments, a migration order determination policy is assigned by user 230 concurrently with reservation manager 215 receiving reservation requests, e.g., reservation request 240. In some embodiments, the migration order determination policy is stored information, e.g., previously defined by user 230 or a tenant-level or vendor-level administrator.

Migrating the one or more existing reservations includes migrating a number of existing reservations necessary to accommodate reservation request 240.

Figure 5:
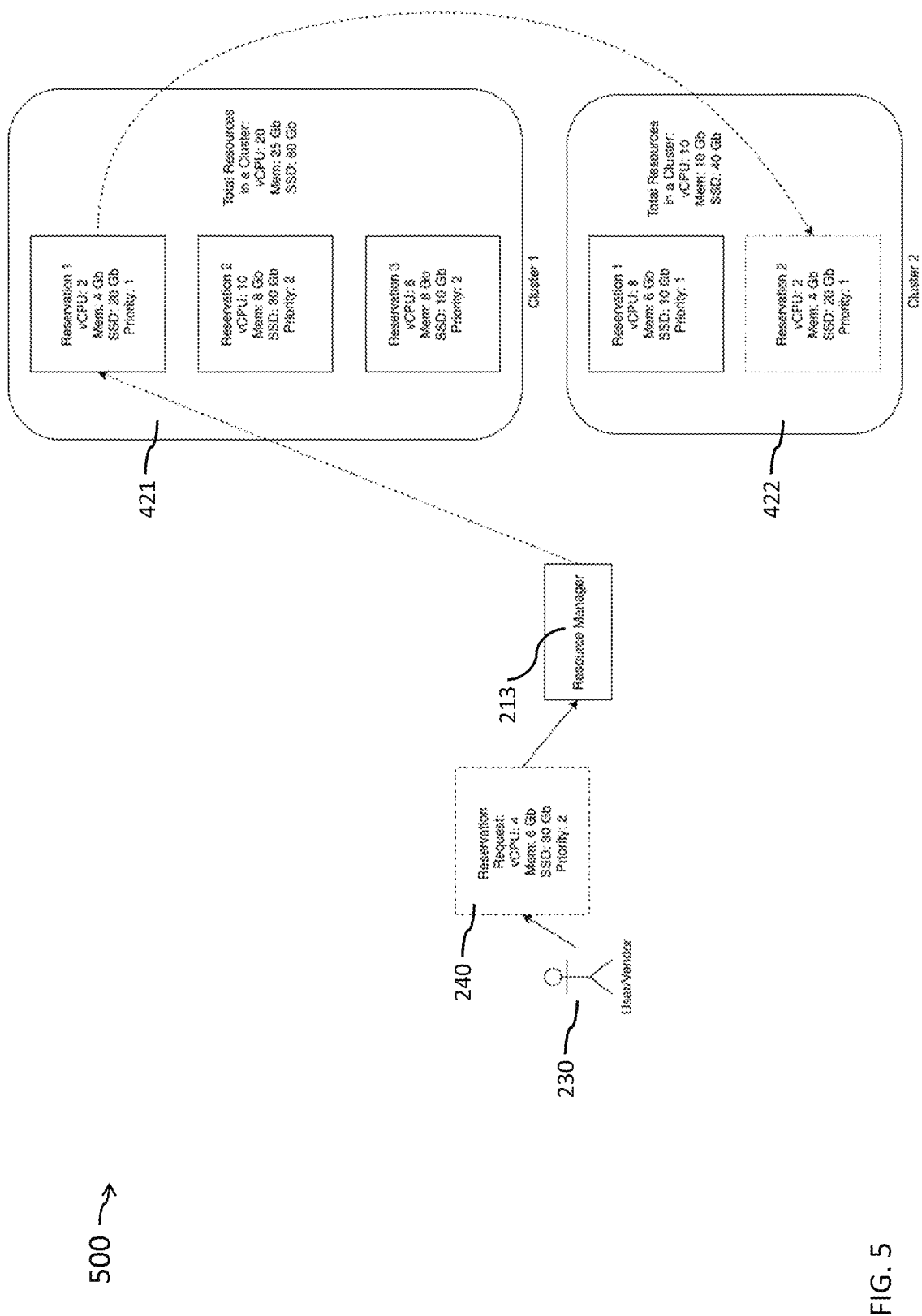
FIG. 5 is a block diagram of a system, in accordance with some embodiments.

FIG. 5 depicts a non-limiting example of system 500 including resource manager 213 (other details of device 220 omitted for the purpose of illustration) and sever clusters 421 and 422. In this example, priority level indicators are non-negative integer values in which a relatively lower priority level indicates a relatively higher priority reservation and a relatively higher priority level indicates a relatively lower priority reservation.

Reservation request 240 received from user 230 includes the indicated resource requirements and a priority level indicator of 2. Existing reservation Reservation 1 of server cluster 421 has a priority level indicator of 1, existing reservation Reservation 2 of server cluster 421 has a priority level indicator of 2, existing reservation Reservation 3 of server cluster 421 has a priority level indicator of 2, and existing reservation Reservation 1 of server cluster 422 has a priority level indicator of 1.

Based on the resource requirements and priority level indicator of reservation request 240, server cluster 421 is identified as the second server cluster, and server cluster 422 is identified as the third server cluster. Reservation 1 of server cluster 421 is migrated to server cluster 422 (as Reservation 2) based on the user-defined policy, and reservation request 240 is assigned to server cluster 422.

In some embodiments, the second server cluster corresponds to a first vendor, and one or more of the at least one third server cluster corresponds to a second vendor different from the first vendor.

FIG. 6 depicts a non-limiting example of system 600 including resource manager 213 (other details of device 220 omitted for the purpose of illustration) and sever clusters 621-623, also referred to respectively as Cluster 1, Cluster 2, and Cluster 3. In this example, user 230 is replaced by a user 631 corresponding to User/Vendor 1 and a user 632 corresponding to User/Vendor 2.

Existing reservations include Reservation 1, Reservation 2, and Reservation 3 assigned to server cluster 621 (Cluster 1), Reservation 1, Reservation 2, Reservation 3, and Reservation 4 assigned to server cluster 622 (Cluster 2), and Reservation 1, Reservation 2, and Reservation 3 assigned to server cluster 623 (Cluster 3).

Each of Reservation 1 of server cluster 621 (Cluster 1), Reservation 1 and Reservation 2 of server cluster 622 (Cluster 2), and Reservation 2 and Reservation 3 of server cluster 623 (Cluster 3) corresponds to user 631 (User/Vendor 1), and each of Reservation 2 and Reservation 3 of server cluster 621 (Cluster 1), Reservation 3 and reservation 4 of server cluster 622 (Cluster 2), and Reservation 1 of server cluster 623 (Cluster 3) corresponds to user 632 (User/Vendor 2).

Each of clusters 621-623 (Cluster 1, Cluster 2, and Cluster 3) is thereby shown to be shared by users 631 (User/Vendor 1) and 632 (User/Vendor 2) such that, in the embodiment depicted in FIG. 6, a given one of clusters 621-623 corresponding to a particular one of vendors Vendor 1 or Vendor 2 is capable of being assigned reservations corresponding to either one of users 631 or 632.

Accordingly, in some embodiments, migrating a reservation corresponding to a given one of users 631 or 632 includes migrating the reservation between a cluster corresponding to a first one of vendors Vendor 1 or Vendor 2 to a second one of vendors Vendor 1 or Vendor 2. In some such embodiments, operation S306 includes migrating a reservation from the second sever cluster (any first one of clusters 621-623) to the third server cluster (any second one of clusters 621-623), the second server cluster corresponding to a first vendor (one of Vendor 1 or Vendor 2), and the at least one third server cluster corresponding to a second vendor (the other of Vendor 1 or Vendor 2) different from the first vendor.

In operation S307 of method 300, the application corresponding to reservation request 240 is deployed on the first or second server cluster. In some embodiments, deploying the application on the first or second server cluster is in response to input received from user 230.

In operation S308 of method 300, reservation record 217 is updated by reservation manager 215 based on assigning reservation request 240 to the first or second server cluster and/or deploying the application corresponding to reservation request 240 on the first or second server cluster.

In some embodiments, one or more of operations S310-S308 are repeated, e.g., corresponding to various operations being performed over a span of time during which data in reservation record 217 is repeatedly updated such that results of performing operations S302-S306 are potentially affected.

By executing some or all of the operations of method 300, a device, e.g., device 220 including orchestrator 211, resource manager 213, and reservation manager 215, is capable of automatically receiving a reservation request, identifying a reservation subset of a plurality of existing reservations, performing a qualification evaluation on a plurality of server clusters, identifying a first server cluster of the qualified server clusters, potentially pre-empting an existing reservation assigned to the first server cluster and assigning the reservation request to the first server cluster, or potentially performing a migration qualification evaluation on the server clusters, migrating an existing reservation from a second server cluster to a third server cluster, and assigning the reservation request to the second server cluster. A system including the device, e.g., system 208 including device 220, is thereby capable of functioning to host, manage, and execute multiple software applications more efficiently than systems that function based on other approaches.

Figure 7:
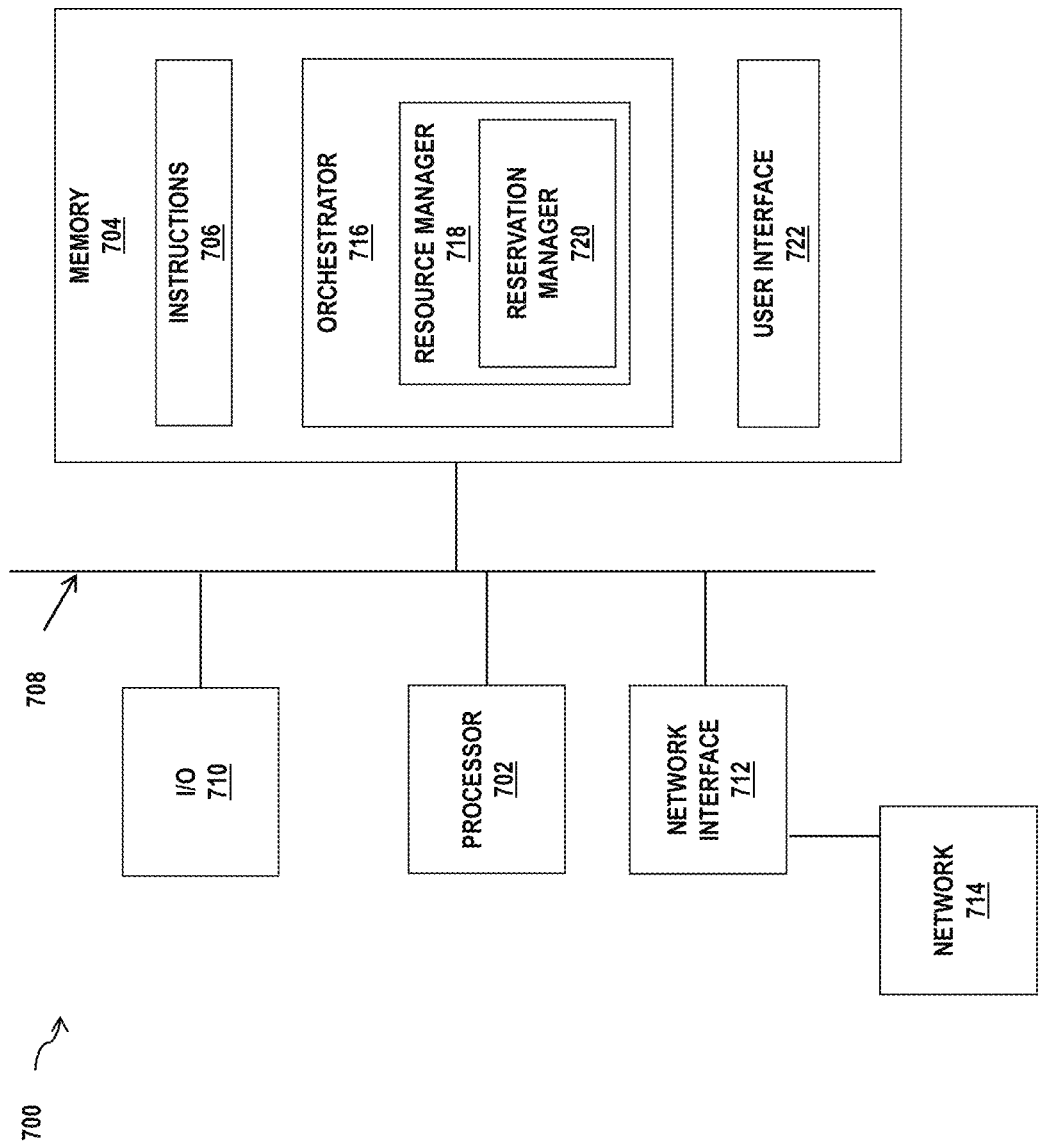
FIG. 7 is a schematic view of a system, in accordance with some embodiments.

FIG. 7 is a schematic view of a system 700, in accordance with some embodiments.

In some embodiments, system 700 is an embodiment of device 210 of FIG. 2, and similar detailed description is therefore omitted.

In some embodiments, system 700 is an embodiment of one or more elements in device 220, and similar detailed description is therefore omitted. For example, in some embodiments, system 700 is an embodiment of one or more of orchestrator 211, resource manager 213, or reservation manager 215, and similar detailed description is therefore omitted.

In some embodiments, system 700 is an embodiment of one or more devices 102 in FIG. 1, and similar detailed description is therefore omitted.

In some embodiments, system 700 is an embodiment of one or more edge devices 106 in FIG. 1, server cluster 214 in FIG. 2, server clusters 421 or 422 in FIGS. 4 and 5, or server clusters 621-623 in FIG. 6, and similar detailed description is therefore omitted.

In some embodiments, system 700 is configured to perform one or more operations of method 300.

System 700 includes a hardware processor 702 and a non-transitory, computer readable storage medium 704 (e.g., memory 704) encoded with, i.e., storing, the computer program code 706, i.e., a set of executable instructions 706. Computer readable storage medium 704 is configured to interface with at least one of devices 102 in FIG. 1, edge devices 106 in FIG. 1, device 220, or one or more servers of server clusters 214, 421, 422, or 621-623.

Processor 702 is electrically coupled to computer readable storage medium 704 by a bus 708. Processor 702 is also electrically coupled to an I/O interface 710 by bus 708. A network interface 712 is also electrically connected to processor 702 by bus 708. Network interface 712 is connected to a network 714, so that processor 702 and computer readable storage medium 704 are capable of connecting to external elements by network 714. Processor 702 is configured to execute computer program code 706 encoded in computer readable storage medium 704 in order to cause system 700 to be usable for performing a portion or all of the operations as described in method 300. In some embodiments, network 714 is not part of system 700. In some embodiments, network 714 is an embodiment of network 104 or 108 of FIG. 1.

In some embodiments, processor 702 is a central processing unit (CPU), a multi-processor, a distributed processing read circuit, an application specific integrated circuit (ASIC), and/or a suitable processing unit.

In some embodiments, computer readable storage medium 704 is an electronic, magnetic, optical, electromagnetic, infrared, and/or a semiconductor read circuit (or apparatus or device). For example, computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, computer readable storage medium 704 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, storage medium 704 stores computer program code 706 configured to cause system 700 to perform one or more operations of method 300. In some embodiments, storage medium 704 also stores information used for performing method 300 as well as information generated during performing method 300, such as orchestrator 716, resource manager 718, reservation manager 720, user interface 722, and/or a set of executable instructions to perform one or more operations of method 300.

In some embodiments, storage medium 704 stores instructions (e.g., computer program code 706) for interfacing with at least devices 102 in FIG. 1, edge devices 106 in FIG. 1, device 220, orchestrator 211, resource manager 213, reservation manager 215, or one or more of server clusters 214, 421, 422, or 621-623. The instructions (e.g., computer program code 706) enable processor 702 to generate instructions readable by at least devices 102 in FIG. 1, edge devices 106 in FIG. 1, device 220, orchestrator 211, resource manager 213, reservation manager 215, or one or more of server clusters 214, 421, 422, or 621-623 to effectively implement one or more operations of method 300 during operation of device 220.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer read circuits are connected. Network interface 712 includes wireless network interfaces such as BLUETOOTH, WIFI, WIMAX, GPRS, or WCDMA; or wired network interface such as ETHERNET, USB, or IEEE-884. In some embodiments, method 300 is implemented in two or more systems 700, and information such as orchestrator 716, resource manager 718, reservation manager 720, and user interface 722 are exchanged between different systems 700 by network 714.

System 700 is configured to receive information related to orchestrator 716 through I/O interface 710 or network interface 712. The information is transferred to processor 702 by bus 708, and is then stored in computer readable medium 704 as orchestrator 716. In some embodiments, orchestrator 716 including resource manager 718 and reservation manager 720 corresponds to orchestrator 211 including resource manager 215 and reservation manager 215, and similar detailed description is therefore omitted. System 700 is configured to receive information related to orchestrator 716 through I/O interface 710 or network interface 712. System 700 is configured to receive information related to reservation manager 720 through I/O interface 710 or network interface 712. The information is stored in computer readable medium 704 as part of reservation manager 720. In some embodiments, part of reservation manager 720 corresponds to reservation record 217, and similar detailed description is therefore omitted. System 700 is configured to receive information related to a user interface through I/O interface 710 or network interface 712. The information is stored in computer readable medium 704 as user interface 722.

In some embodiments, method 300 is implemented as a standalone software application for execution by a processor. In some embodiments, method 300 is implemented as corresponding software applications for execution by one or more processors. In some embodiments, method 300 is implemented as a software application that is a part of an additional software application. In some embodiments, method 300 is implemented as a plug-in to a software application.

In some embodiments, method 300 is implemented as a software application that is a portion of an orchestrator tool. In some embodiments, method 300 is implemented as a software application that is used by an orchestrator tool. In some embodiments, one or more of the operations of method 300 is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method executed by a processor. In some embodiments, the method includes receiving a reservation request corresponding to resource requirements of an application, wherein the reservation request includes a role-based access indicator and a first priority level indicator, based on the role-based access indicator, identifying a reservation subset of a plurality of existing reservations, and performing a qualification evaluation on a plurality of server clusters based on the resource requirements, the first priority level indicator, the reservation subset, and infrastructure resources of each server cluster of the plurality of server clusters. When the qualification evaluation determines that the plurality of server clusters includes a first subset of at least one qualified server cluster, the method includes identifying a first server cluster either as a sole qualified server cluster of the first subset or by ranking multiple qualified server clusters of the first subset by calculating a first score of each qualified server cluster of the first subset, pre-empting one or more existing reservations of the reservation subset assigned to the first server cluster based on a first priority ranking of the first priority level indicator being higher than one or more priority rankings corresponding to priority level indicators of the one or more existing reservations, and assigning the reservation request to the first server cluster.

Another aspect of this description relates to an apparatus. In some embodiments, the apparatus includes a memory having non-transitory instructions stored, and a processor coupled to the memory, and being configured to execute the instructions, thereby causing the apparatus to receive, from the user interface, a reservation request corresponding to resource requirements of an application, wherein the reservation request includes a role-based access indicator and a first priority level indicator, based on the role-based access indicator, identify a reservation subset of a plurality of existing reservations, and perform a qualification evaluation on a plurality of server clusters based on the resource requirements, the first priority level indicator, the reservation subset, and infrastructure resources of each server cluster of the plurality of server clusters, When the qualification evaluation determines that the plurality of server clusters comprises a first subset of at least one qualified server cluster, a first server cluster is identified either as a sole qualified server cluster of the first subset or by ranking multiple qualified server clusters of the first subset by calculating a first score of each qualified server cluster of the first subset, one or more existing reservations of the reservation subset assigned to the first server cluster is pre-empted based on a first priority ranking of the first priority level indicator being higher than one or more priority rankings corresponding to priority level indicators of the one or more existing reservations, and the reservation request is assigned to the first server cluster.

Still another aspect of this description relates to a computer-readable medium. In some embodiments, the computer-readable medium includes instructions executable by a controller of a user equipment to cause the controller to perform operations including receiving a reservation request corresponding to resource requirements of an application, wherein the reservation request includes a role-based access indicator and a first priority level indicator, based on the role-based access indicator, identifying a reservation subset of a plurality of existing reservations, and performing a qualification evaluation on a plurality of server clusters based on the resource requirements, the first priority level indicator, the reservation subset, and infrastructure resources of each server cluster of the plurality of server clusters. When the qualification evaluation determines that the plurality of server clusters includes a first subset of at least one qualified server cluster, the method includes identifying a first server cluster either as a sole qualified server cluster of the first subset or by ranking multiple qualified server clusters of the first subset by calculating a first score of each qualified server cluster of the first subset, pre-empting one or more existing reservations of the reservation subset assigned to the first server cluster based on a first priority ranking of the first priority level indicator being higher than one or more priority rankings corresponding to priority level indicators of the one or more existing reservations, and assigning the reservation request to the first server cluster. When the qualification evaluation determines that the plurality of server clusters does not include the first subset, the method includes performing a migration qualification evaluation on the plurality of server clusters based on the resource requirements, the infrastructure resources, and a comparison of the first priority level indicator to priority level indicators of one or more reservations of the reservation subset assigned to each server cluster of the plurality of server clusters, and when the migration qualification evaluation determines that the plurality of server clusters includes a second subset of at least one qualified migration server cluster, identifying a second server cluster either as a sole qualified migration server cluster of the second subset or by ranking multiple qualified migration server clusters of the second subset by calculating a second score of each qualified migration server cluster of the second subset, migrating one or more existing reservations of the reservation subset assigned to the second server cluster to at least one third server cluster of the plurality of server clusters based on the first priority ranking being equal to or lower than one or more priority rankings corresponding to the priority level indicators of the one or more existing reservations, and assigning the reservation request to the second server cluster.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method executed by an orchestrator executed on a processor of a multi-tenant cloud system, the method comprising:
receiving a reservation request corresponding to resource requirements of an application, the reservation request comprising a role-based access indicator and a first priority level indicator;
storing information related to the reservation request in a reservation record of the orchestrator;
executing a plurality of applications comprising the application on a plurality of server clusters of the multi-tenant cloud system;
receiving a selection of a first server cluster of the plurality of server clusters, wherein each of the plurality of server clusters has an associated score, and the first server cluster has a highest score among each score, wherein each score is based on a difference between a respective server cluster capacity and the resource requirements;
migrating at least one of one or more existing reservations assigned to the first server cluster to at least one second server cluster of the plurality of server clusters based on the first priority level indicator being equal to or lower than a respective one or more priority level indicators of the one or more existing reservations, wherein the at least one of the one or more existing reservations is based on the role-based access indicator; and
updating the reservation record based on changes in hardware and software capacities of the plurality of server clusters.

2. The method of claim 1, wherein the resource requirements comprise one or more of a server cluster tag, a location requirement, a central processing unit (CPU) requirement, a graphics processing unit (GPU) requirement, a memory requirement, a hard disk drive (HDD) storage requirement, or a solid state drive (SSD) storage requirement.

3. The method of claim 1, wherein a total of the resource requirements of the application and cumulative resource requirements of the one or more existing reservations do not exceed a resource pool limit stored in the reservation record.

4. The method of claim 1, wherein the reservation record comprises expiration dates associated with each of the one or more existing reservations.

5. The method of claim 4, wherein a status of an existing reservation is automatically altered on the date specified by the expiration date without cancelling the reservation.

6. The method of claim 4, wherein an existing reservation is canceled or invalidated on the date specified by the expiration date.

7. The method of claim 4, wherein a reservation is automatically canceled on a date corresponding to a predetermined time period following the date specified by the expiration date.

8. The method of claim 1, wherein each server cluster of the plurality of server clusters corresponds to a unique vendor, and each vendor includes one or more tenants.

9. An apparatus, comprising:
a user interface;
a memory having non-transitory instructions stored therein; and
a processor coupled to the memory and the user interface, and the processor being configured to execute the non-transitory instructions, thereby causing the apparatus to execute a method comprising:
receiving a reservation request from the user interface corresponding to resource requirements of an application, the reservation request comprising a role-based access indicator and a first priority level indicator;
storing information related to the reservation request in a reservation record of the memory;
executing a plurality of applications comprising the application on a plurality of server clusters of a multi-tenant cloud system;
receiving a selection of a first server cluster of the plurality of server clusters from the user interface, wherein each of the plurality of server clusters has an associated score, and the first server cluster has a highest score among each score, wherein each score is based on a difference between a respective server cluster capacity and the resource requirements;
migrating at least one of one or more existing reservations assigned to the first server cluster to at least one second server cluster of the plurality of server clusters based on the first priority level indicator being equal to or lower than a respective one or more priority level indicators of the one or more existing reservations, wherein the at least one of the one or more existing reservations is based on the role-based access indicator; and
updating the reservation record based on changes in hardware and software capacities of the plurality of server clusters.

10. The apparatus of claim 9, wherein the resource requirements comprise one or more of a server cluster tag, a location requirement, a central processing unit (CPU) requirement, a graphics processing unit (GPU) requirement, a memory requirement, a hard disk drive (HDD) storage requirement, or a solid state drive (SSD) storage requirement.

11. The apparatus of claim 9, wherein a total of the resource requirements of the application and cumulative resource requirements of the one or more existing reservations do not exceed a resource pool limit stored in the reservation record.

12. The apparatus of claim 9, wherein the reservation record comprises expiration dates associated with each of the one or more existing reservations.

13. The apparatus of claim 12, wherein a status of an existing reservation is automatically altered on the date specified by the expiration date without cancelling the reservation.

14. The apparatus of claim 12, wherein an existing reservation is canceled or invalidated on the date specified by the expiration date.

15. The apparatus of claim 12, wherein a reservation is automatically canceled on a date corresponding to a predetermined time period following the date specified by the expiration date.

16. The apparatus of claim 9, wherein each server cluster of the plurality of server clusters corresponds to a unique vendor, and each vendor includes one or more tenants.

17. A non-transitory computer-readable storage medium including instructions executable by a controller of a user equipment to cause the controller to perform operations comprising:
receiving a reservation request corresponding to resource requirements of an application, the reservation request comprising a role-based access indicator and a first priority level indicator;
storing information related to the reservation request in a reservation record of an orchestrator of a multi-tenant cloud system;
executing a plurality of applications comprising the application on a plurality of server clusters of the multi-tenant cloud system;
receiving a selection of a first server cluster of the plurality of server clusters, wherein each of the plurality of server clusters has an associated score, and the first server cluster has a highest score among each score, wherein each score is based on a difference between a respective server cluster capacity and the resource requirements;
migrating at least one of one or more existing reservations assigned to the first server cluster to at least one second server cluster of the plurality of server clusters based on the first priority level indicator being equal to or lower than a respective one or more priority level indicators of the one or more existing reservations, wherein the at least one of the one or more existing reservations is based on the role-based access indicator; and
updating the reservation record based on changes in hardware and software capacities of the plurality of server clusters.

18. The non-transitory computer-readable storage medium of claim 17, wherein the resource requirements comprise one or more of a server cluster tag, a location requirement, a central processing unit (CPU) requirement, a graphics processing unit (GPU) requirement, a memory requirement, a hard disk drive (HDD) storage requirement, or a solid state drive (SSD) storage requirement.

19. The non-transitory computer-readable storage medium of claim 17, wherein the reservation record comprises expiration dates associated with each of the one or more existing reservations.

20. The non-transitory computer-readable storage medium of claim 17, wherein each server cluster of the plurality of server clusters corresponds to a unique vendor, and each vendor includes one or more tenants.

* * * * *